Aug. 17, 1965  G. J. LINDER, JR  3,200,725
MAGAZINE FOR A CAMERA
Filed Feb. 8, 1962  4 Sheets-Sheet 1

FIG. I

INVENTOR.
GEORGE J. LINDER JR.
BY
ATTORNEY

Aug. 17, 1965  G. J. LINDER, JR  3,200,725
MAGAZINE FOR A CAMERA
Filed Feb. 8, 1962  4 Sheets-Sheet 3
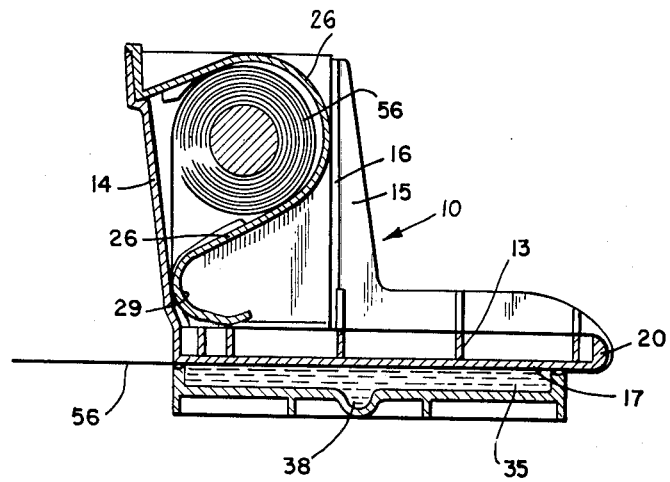
FIG. 4
FIG. 3
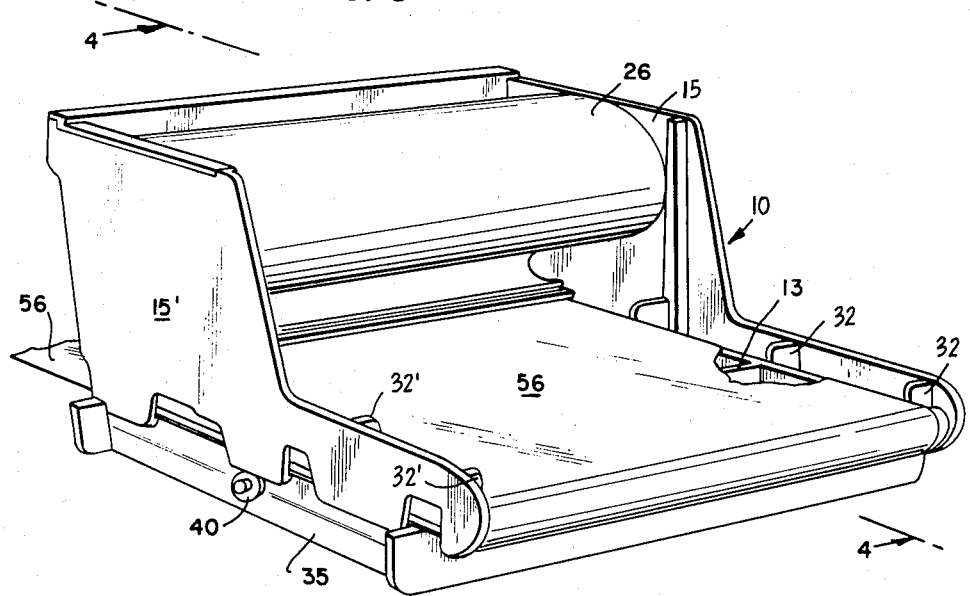
INVENTOR.
GEORGE J. LINDER JR.
BY
ATTORNEY

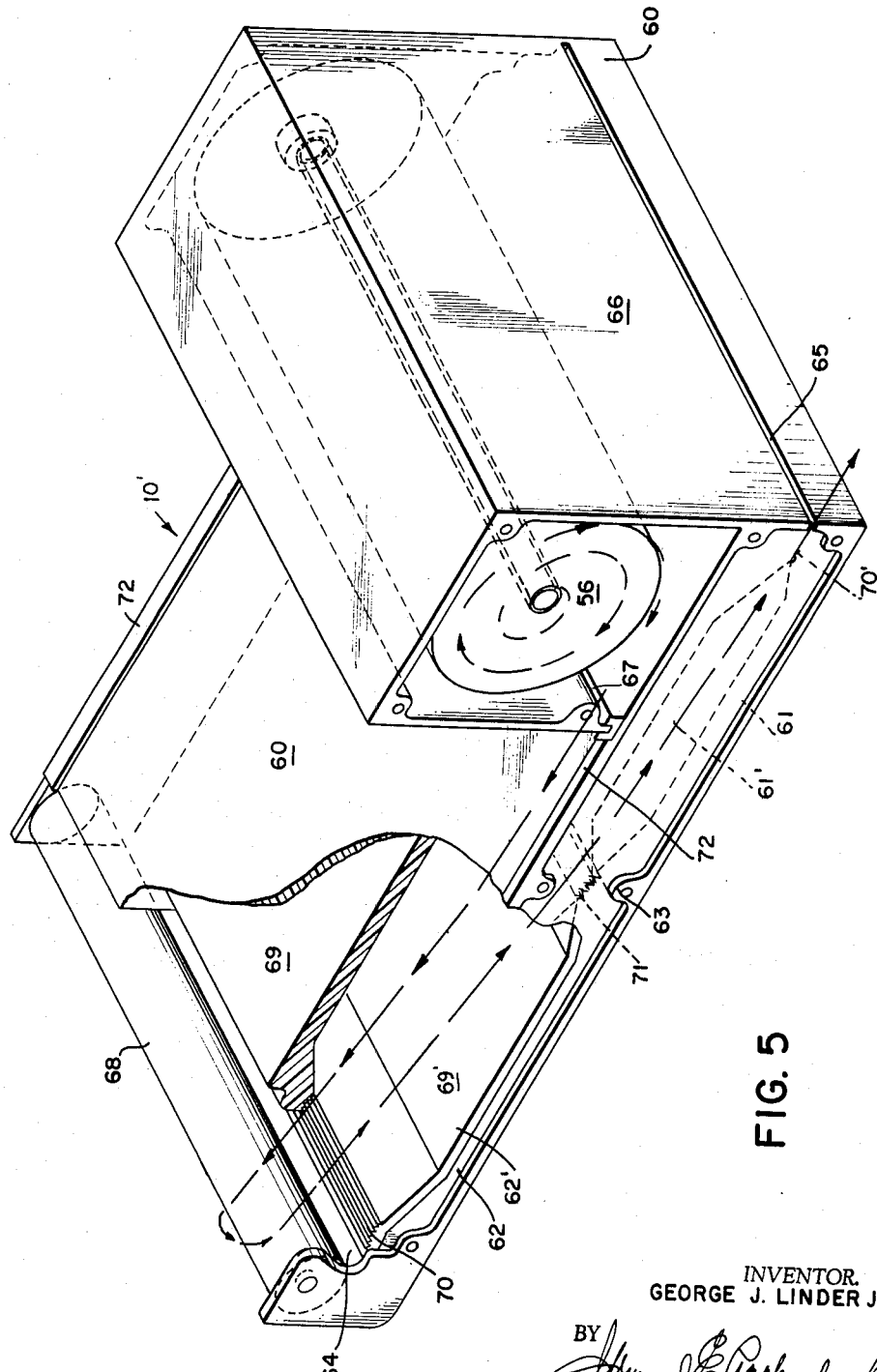

United States Patent Office 3,200,725
Patented Aug. 17, 1965

3,200,725
MAGAZINE FOR A CAMERA
George J. Linder, Jr., Mineola, N.Y., assignor to Camera Corporation of America, New York, N.Y., a corporation of Delaware
Filed Feb. 8, 1962, Ser. No. 171,988
14 Claims. (Cl. 95—13)

This invention relates to photographic equipment, and more particularly to means for containing a supply of film within the housing of a camera, in integral relationship with processing means for treating short sections of photographic, photosensitive material.

It is the principal object of this invention to provide a photographic film assemblage, in which, after a short section of a web of photosensitive material is exposed to the action of light, means are provided for thereafter subjecting said exposed material to the action of processing material capable of forming a positive image of a subject image to which such photosensitive material has been exposed.

Another object of the present invention is to provide means, in a camera, for subjecting an exposed film to the action of processing material within at least one liquid-tight chamber containing a liquid and/or gelatinous material.

A further object herein is the provision of processing means, in a camera, adapted to form a positive image, upon an exposed photosensitive material which is contained in a single replaceable unit together with a web of film, and which is removable and replaceable within said camera.

Another object of this invention is the provision, in combination with a camera, of at least one liquid-tight chamber containing a chemical processing material through which a section of exposed photosensitive film may pass for processing therein.

A still further object of the present invention is the provision of a unitary removable disposable magazine having means for containing a roll of film therein, said means being in integral relationship to processing means for treating a short section of film to form a positive print upon said film after exposure thereof to light.

In accomplishing the foregoing objects there is provided, in a camera, a removable unitary magazine having a light-tight film container for storing a web of photosensitive film and at least one liquid-tight chamber containing chemical processing material in integral relationship with said film container. Provision is further made for passing a section of an exposed photosensitive material through the liquid-tight chamber for chemical processing therein. Further provision is made with respect to the liquid-tight chamber so that the possibility of trapping air is eliminated when the chemical processing material necessary in processing exposed photosensitive material is introduced therein.

Furthermore, in accomplishing the foregoing objects, the unitary removable disposable magazine of the present invention is particularly adapted to be used with conventional types of direct positive film, such as, and by the way of example only, films having a diazonium photosensitive layer or having two image forming materials on a single backing web of material, a negative image being formed in one image forming material by means of a direct photosensitive process and a positive image being formed in the second image forming material by means of a diffusion transfer process, the negative image forming material and the positive image forming material being either combined within a single layer of emulsion or being in separate superposed layers of emulsion on a single web of backing material; and a conventional and suitable processing material containing the required constituents rendering such film capable of producing a positive image completely within the unitary magazine.

In the case of diffusion transfer types of direct positive films, the negative image formed may be of such a low density as to permit its being left in place without substantially detracting from the image quality of the more dense positive image or may be formed within a layer so constituted as to be removable from an underlying positive image layer, leaving only the positive image layer upon the backing material.

The above and further objects and advantages of the present invention will be apparent to those versed in the art from the following description of a specific embodiment of the invention as illustrated in the drawing wherein like characters designate like parts in the several views, and in which:

FIG. 3 is a view similar to that shown in FIG. 2 showing the principal parts assembled to form a unitary magazine structure;

FIG. 4 is a view taken on line 4—4 of FIG. 3; and

FIG. 5 is an isometric view of a further embodiment of a magazine structure having two liquid-tight chambers.

Figure 1:
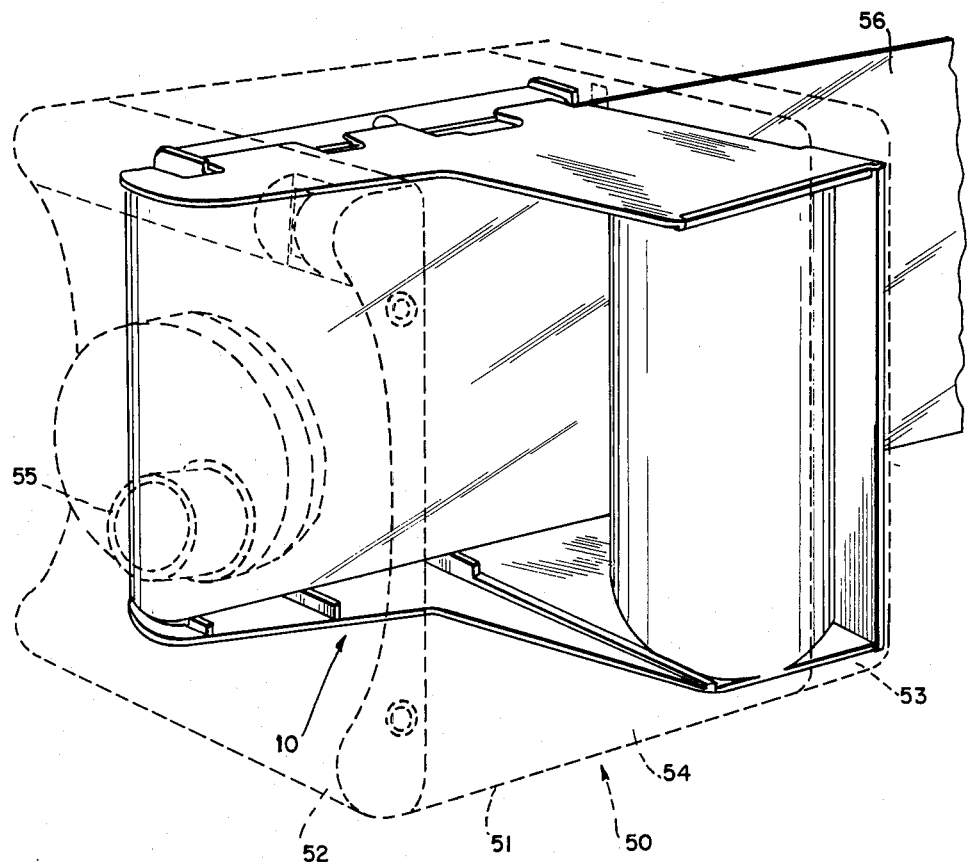
FIG. 1 is an isometric view of the magazine according to the present invention in operative relationship to a preferred type of camera shown in a phantom view.
Figure 2:
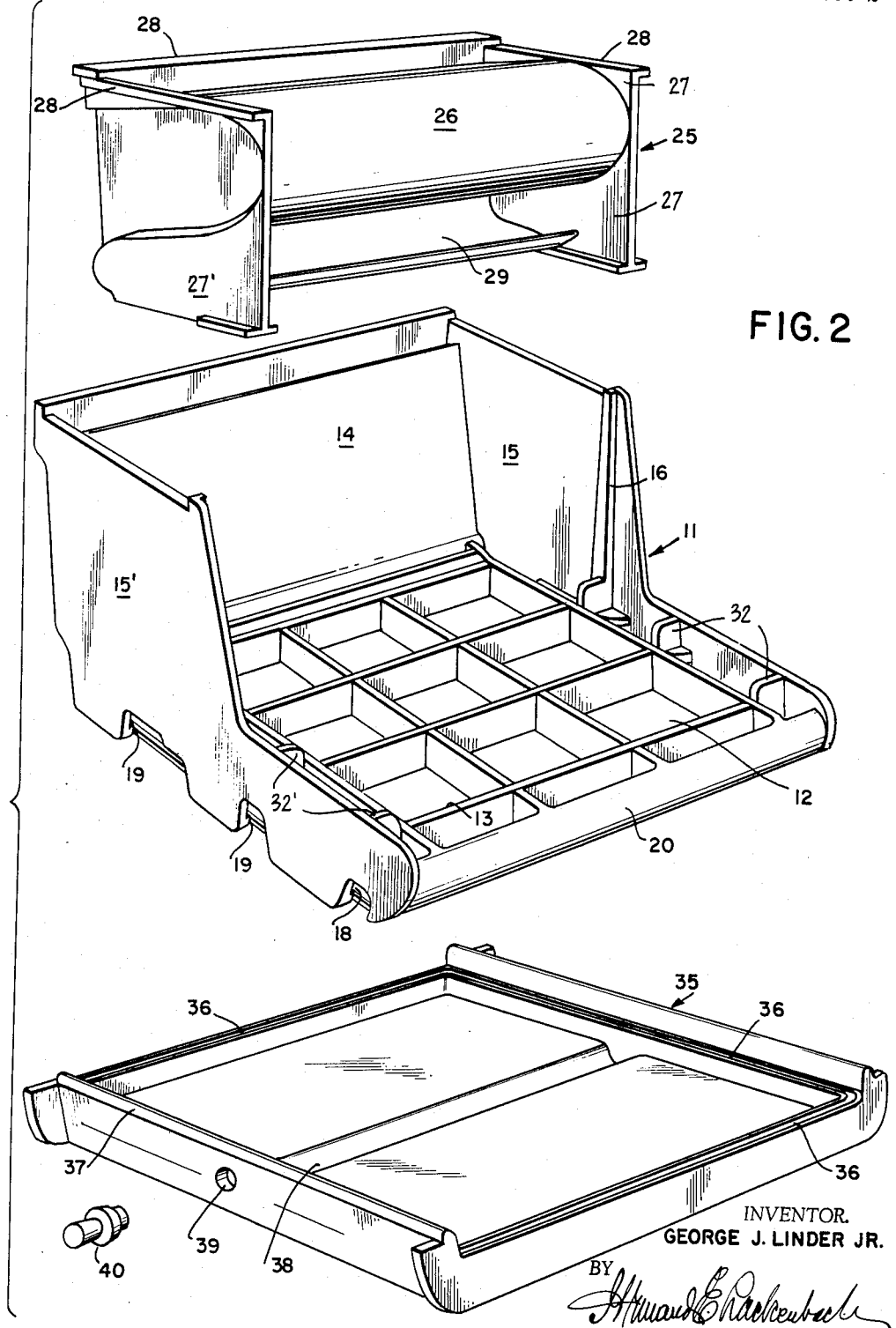
FIG. 2 is an exploded isometric view of the principal parts forming the magazine according to the present invention.

Referring now to the drawing, the magazine device 10 is illustrated in FIG. 1 in operative relationship with a conventional camera 50. The camera 50 of the present embodiment, is formed of a box-like body comprising a barrel 51, a front shell 52, and a rear removable shell 53 in friction-fit to the barrel 51, said barrel 51, and shells 52, 53, forming an internal light-tight chamber 54. A lens and shutter assembly 55 mounted over an aperture (not shown) upon the front shell 52 controls the admittance or exclusion of actinic light which is transmitted to a photosensitive material 56 contained within chamber 54 by suitable image reflecting means (not shown). The film 56 preferably is of the type conventionally known as "Diffusion Transfer Reversal Film" comprising a positive layer and a negative layer, with the latter being particularly adapted to be stripped from the former subsequent to the transfer of the subject image to the positive layer. Further explanation of this conventional type of film is made to Weyde, U.S. Patents 2,712,995 and 2,937,945 for further amplification of the film layer structure wherein both the negative and positive image forming materials are carried by a single backing web of material and to Rott, U.S. Patent 2,352,014; Land U.S. Patent 2,661,292; and Basch, U.S. Patent 3,048,486 for further amplification of different image forming materials capable of being coated on a single backing web of material and developers therefore which render possible the development of a positive image completely with the magazine device 10, presently to be fully described. Land Patent 2,661,292 further discusses one type of diazonium photosensitive layer for producing a direct positive image and which could be used in the magazine device 10 of the instant invention.

The magazine device 10, according to the present invention is slidably fitted within barrel 51, and is fabricated of a rigid material such as metal, plastic, nylon or the like, and is comprised of a frame member or chassis 11 having mounted thereupon a film container 25, and a reservoir 35 thereunder to form an integral unit. The chassis 11 is comprised of a substantially rectangular body portion 12, the size thereof being approximately in conformity with the depth of barrel 51. Girders 13, upon the upper surface of said body portion 12 are provided, for furnishing additional strength and rigidity thereto, and, additionally, serve as an image plane for film 56 to receive a subject image thereupon, and for traversal of said film 56 therealong. Extending along the upper edges of said body portion 12, substantially at right angles thereto, there is provided a rear wall 14 and two side walls 15, 15′ partially along the side edges thereof, forming a part of the chamber, which, in conjunction with the film container 25, presently to be described, forms a light-tight film receptacle. Guides 16 on the inner surfaces of side walls 15, 15′ serve to guide and retain film container 25 in position when inserted within wall structures 14, 15, 15′. A substantially flat undersurface 17 of body portion 12 is provided with channels 18, along the sides thereof. Projecting inwardly within channels 18 there is provided a plurality of stud members 19. Body portion 12 at the forward end thereof is provided with an arcuate edge 20 to serve as a surface for the traversal therealong of film 56.

Further guides 32, 32′ are provided on either side of body portion 12, and are adapted to guide film 56 in its traversal upon the film image plane atop girders 13.

The film container 25 is provided with a substantially semi-tubular portion 26 and substantially rectangular, side walls 27, 27′. Said side walls 27, 27′ are medially recessed and are adapted to be placed in the core of a web of film 56.

Along the upper edge of the film container 25 there is provided an overhanging shoulder 28 adapted to rest upon the upper edge of walls 14, 15, 15′ to form a light-tight chamber in which film 56 may be stored. The semi-tubular portion 26 of film container 25 is further provided with a reverse semi-tubular lip 29 adapted to act as a guide or runner upon which film 56 is directed outwardly from film container 25.

Secured to the undersurface 17 of chassis 11 there is provided a reservoir 35 comprising a tray-like structure having a channel 36 disposed around the entire upper perimeter thereof, and is adapted to form a liquid-tight seal when disposed against the undersurface of chassis 11 with a gasket or like sealing means therebetween. A hook-like shoulder structure 37 is disposed on either side of said reservoir 35 and extends upwardly from channels 36. Said hook-like structure 37 is adapted to be locked into studs 19 when placed within channels 18 so as to be secured thereto.

A trough 38 is further provided, preferably disposed medially across the width of reservoir 35. Additionally, a filling aperture 39 is provided in alignment with the trough 38, the same being cooperable with a cap 40.

In the use of the magazine 10, the film container 25 is fitted upon chassis 11, after a film roll 56 is deposited within the semi-tubular portion 26 thereof. The film 56 is threaded around the reverse portion semi-tubular lip 29, over the top of body portion 12 forming the image plane of the camera in the area of the girders 13, around arcuate edge 20, and along the flat undersurface 17 of body structure 12, and out of a slot (not shown) provided in the rear of shell 53 after magazine 10 has been slidably fitted within barrel 54. The reservoir 35 is secured at the undersurface of chassis 11, the hook-like members 37 locking with studs 19. It will be noted that a friction fit results at the front and rear of reservoir, through which film 56 passes. After injecting chemical material necessary for processing film 56 into aperture 39, the cap 40 is placed over said aperture 39 and sealed. As a section of film 56 is exposed, it is drawn by simple manipulation through reservoir 35 to be processed therein.

Although the magazine 10 of the present invention has been described as comprising a plurality of sectional elements, it is within the ambit herein to include a structure having a light-tight film container in operative relationship to a liquid tight processing chamber made, for example, by molding or fabricating hingedly affixed parts, or as a unitary structure.

In another embodiment of the present invention, the magazine 10 according to the present invention is comprised of a substantially rectangular frame structure 60 having a substantially elongated hollow interior divided into two chambers 61, 62 formed by a laterally extending lip 63 medially therein. Said frame structure 60 is provided with a forward lateral aperture 64 and rear aperture 65, said apertures being only large enough to allow a single-ply film to pass therethrough. Mounted upon said frame 60, there is provided a light-tight compartment 66 which may be a separate structure appended to frame 60, or a unitary part thereof, as illustrated in FIG. 5. A lateral aperture 67 serving as an exit for film 56 is provided at the lower section of film compartment 66. At the forward end of frame 60, immediately forward aperture 64, there is provided a roller 68 to serve as a means for manipulating the traversal of film 56 into chamber 61. Interiorly disposed within chambers 61, 62 there is provided a top and a bottom hollowed resilient lining wall or gasket 69, 69′ respectively, having interlocking serrated edges 70 disposed upon thickened gasket forming edges integrally formed on the lining walls 69, 69′ to form liquid tight chambers 61′, 62′. A laterally disposed serrated portion 71 renders the chambers 61′ and 62′ independently liquid tight.

In the operation of the magazine 10′ having two chambers, film 56 is threaded through aperture 67, along frame 60, and around roller 68, at which point said film 56 enters aperture 64 and through serrated edge 70. Said film is further threaded through chamber 62′, through laterally disposed serrated portion 71, through chamber 61′, and exits through rear serrated edges 70′ and aperture 65, as illustrated in FIG. 5. Side guides 72, along both sides of frame member 60, may be provided for guiding the film 56 along the path desired.

It is to be understood that although the present invention has been described and shown in the drawings with reference to the embodiments there illustrated, various embodiments and adaptations may be made without constituting a departure from the spirit and scope of the invention as herein described and defined.

I claim:
1. In a camera, a magazine comprising
 (a) a substantially rectangular frame member
 (b) a light-tight film container mounted upon said frame member at the rear thereof; said container having a web of photo-sensitive film therein;
 (c) a liquid-tight container integral with said frame member and extending upon the undersurface thereof for passage therethrough of said photo-sensitive film,
 (d) film guide means laterally disposed on either side of said frame member adjacent the upper surface thereof,
 (e) said frame member having a transverse arcuate lip at the forward end thereof for passage of a portion of said film therearound,
 (f) a plurality of girder members disposed upon the upper surface of said frame member to furnish rigid support and strength thereto;
 (g) said frame member, on the undersurface thereof being disposed on a substantially flat plane, and
 (h) locking means disposed on either side of said frame member adjacent the undersurface thereof for securement of said liquid-tight container thereto; and
 (i) a rear vertical wall upwardly disposed from the top of said frame member at the rear thereof, and two vertical walls at right angles thereto along a portion of the sides of said frame member, said walls adapted to receive and securely retain therebetween said film container.

2. In a camera, a magazine comprising
 (a) a substantially rectangular frame member
 (b) a light-tight film container mounted upon said frame member at the rear thereof; said container having a web of photo-sensitive film therein;

(c) a liquid-tight container integral with said frame member and extending upon the undersurface thereof for passage therethrough of said photo-sensitive film, (d) film guide means laterally disposed on either side of said frame member adjacent the upper surface thereof, (e) said frame member having a transverse arcuate lip at the forward end thereof for passage of a portion of said film therearound, (f) a plurality of girder members disposed upon the upper surface of said frame member to furnish rigid support and strength thereto;

(g) said frame member, on the undersurface thereof being disposed on a substantially flat plane, and (h) locking means disposed on either side of said frame member adjacent the undersurface thereof for securement of said liquid-tight container thereto; and (i) a rear vertical wall upwardly disposed from the top of said frame member at the rear thereof, and two vertical walls at right angles thereto along a portion of the sides of said frame member, said walls adapted to receive and securely retain therebetween said film container, (j) said light-tight film container comprising a pair of vertically disposed side walls in friction fit with said side walls of said frame member, and (k) an upper transverse semi-tubular portion for retaining therein a web of photo-sensitive film and a lower reverse semi-tubular portion terminating above the top of said frame member to form a transverse outlet for traversal of said film therebetween.

3. In a camera, a magazine according to claim 2, including tension means in said film container for retention of said web of film therein.

4. In a camera, a removable disposable unitary magazine for storing a web of photosensitive film, enabling said film to be exposed to a subject image, and subjecting said exposed film to the action of a processing material capable of forming a positive image thereupon, said magazine comprising:

a frame member;

said frame member being so constituted and arranged as to present an image plane across which a web of photosensitive film is particularly adapted to pass for subjecting the same to a subject image, a light-tight container positioned upon said frame member;

said container being particularly adapted to contain a web of photosensitive film therewithin, a liquid-tight container fixedly, structurally associated with said frame member having liquid-tight sealing means in at least one wall thereof to retain a developing liquid within said liquid-tight container and enable the passage of a web of film therethrough;

said liquid-tight container and said frame member being so constituted and arranged as to enable the passage therebetween of said film web into contact with a developing liquid contained within said liquid-tight container and the development thereupon of a positive image subsequent to the passage of said film web across said image plane, and an arcuate generally transversely extending lip at an end of said frame member for the passage thereupon and thereabout of said web of photosensitive film, subsequent to its passage across said image plane and succeedingly to its passage between said frame member and said liquid-tight container.

5. In a camera, a removable disposable unitary magazine for storing a web of photosensitive film, enabling said film to be exposed to a subject image, and subjecting said exposed film to the action of a processing material capable of forming a positive image thereupon, said magazine comprising:

a frame member;

said frame member being so constituted and arranged as to present an image plane across which a web of film is particularly adapted to pass for subjecting the same to a subject image, a light-tight container positioned upon said frame member;

said light-tight container being particularly adapted to contain a web of photosensitive film therewithin, a liquid-tight container fixedly, structurally associated with said frame member having liquid-tight sealing means in at least one wall thereof to retain a developing liquid within said liquid-tight container and enable the passage of a web of film therethrough;

said liquid-tight container and said frame member being so constituted and arranged as to enable the passage therebetween of said film web into contact with a developing liquid contained within said liquid-tight container and the development thereupon of a positive image subsequent to the passage of said film web across said image plane, and a plurality of girder members disposed upon one of a plurality of surfaces of said frame member to add strength and rigidity thereto and for defining the image plane extending thereacross.

6. In a camera, a removable disposable unitary magazine for storing a web of photosensitive film, enabling said film to be exposed to a subject image, and subjecting said exposed film to the action of a processing material capable of forming a positive image thereupon, said magazine comprising:

a frame member;

said frame member being so constituted and arranged as to present an image plane across which a web of film is particularly adapted to pass for subjecting the same to a subject image, a plurality of girder members disposed upon one of a plurality of surfaces of said frame member to add strength and rigidity thereto and for defining the image plane extending thereacross, a light-tight container positioned upon said frame member;

said container being particularly adapted to contain a web of photosensitive film there within, a liquid-tight container fixedly, structurally associated with said frame member having liquid-tight sealing means in at least one wall thereof to retain a developing liquid within said liquid-tight container and enable the passage of a web of film therethrough;

said liquid-tight container and said frame member being so constituted and arranged as to enable the passage therebetween of said film web into contact with a developing liquid contained within said liquid-tight container and the development thereupon of a positive image subsequent to the passage of said film web across said image plane, and an arcuate generally transversely extending lip at an end of said frame member for the passage thereupon and thereabout of a web of photosensitive film, subsequent to its passage across said image plane and succeedingly to its passage between said frame member and said liquid-tight container.

7. In a camera, a removable disposable unitary magazine as defined in claim 6, wherein:

said frame member comprises:

film guide means laterally disposed on each side thereof for guiding the passage of a web of photosensitive film across said image plane.

8. In a camera, a removable disposable unitary magazine as defined in claim 7, wherein:

said film guide means comprises:

at least one stud member extending generally vertically upwardly from each side of said frame member.

9. In a camera, a removable disposable unitary magazine as defined in claim 8, wherein there is provided:
locking means disposed relative to each side of said frame member for fixedly structurally associating said liquid-tight container to said frame member.

10. In a camera, a removable disposable unitary magazine for storing a web of photosensitive film enabling said film to be exposed to a subject image, and subjecting exposed film to an action of a processing material capable of forming a positive image thereupon, said magazine comprising:
a frame member;
said frame member comprising a generally rectangular body portion having a first surface and a second surface,
said first surface being so constituted and arranged as to present an image plane across which a web of photosensitive film is particularly adapted to pass for subjecting the same to a subject image,
said second surface being in spaced parallel relationship to said first surface,
a light-tight container positioned upon said frame member,
said light-tight container being particularly adapted to contain a web of photosensitive film therewithin,
a liquid-tight container fixedly, structurally associated with said frame member for containing therewithin a processing material capable of forming a positive image upon a web of photosensitive film, said liquid-tight container comprising;
a tray member,
said tray member being secured to said body portion and disposed generally parallel to said second surface of said body portion to form a liquid-tight chamber between said tray member and said second surface, and
means for forming a liquid-tight seal between said tray member and said frame member;
said means for forming a liquid-tight seal having apertures disposed in longitudinally spaced relationship of and between said frame member and said tray member extending generally transversely thereof, enabling the passage therethrough of a web of photosensitive film;
said liquid-tight container and said frame member being so constituted and arranged as to enable the passage therebetween of a web of photosensitive film and the development thereupon of a positive image subsequent to the passage of said web of film across said image plane.

11. In a camera, a removable disposable unitary magazine, as defined in claim 10, wherein:
said means for forming a liquid-tight seal comprises;
a channel disposed within and extending along one of said frame member and said tray member, and
a gasket member disposed within said channel and being particularly adapted to extend therefrom into sealing mutual co-operative engagement with the other of said tray member and said frame member.

12. In a camera, a removable disposable magazine for storing a web of photosensitive film enabling said film to be exposed to a subject image, and subjecting said exposed film to an action of a processing material comprising:
a frame member having a substantially elongated hollow interior chamber;
said frame member being so constituted and arranged as to present an image plane across which a web of photosensitive film is particularly adapted to pass for subjecting the same to a subject image,
a light-tight container positioned upon said frame member;
said container being particularly adapted to contain a web of photosensitive film therewithin, and
a liquid-tight container fixedly, structurally associated with said frame member and disposed within said hollow interior chamber for containing therewithin a processing material capable of forming a positive image upon a web of photosensitive film, said liquid-tight container comprising:
a plurality of spaced resilient lining walls comprising an integral mutually cooperating interengaging sealing gasket projecting therefrom, and
sealing means disposed on said sealing gaskets of said lining walls for sealingly containing said processing material within the space defined by said lining walls and having at least one aperture therethrough particularly adapted to enable the translation of a web of photosensitive film through the space defined by said lining walls for the treatment thereof by said processing material and the development thereupon of a positive image.

13. In a camera, a removable unitary magazine as defined in claim 12, wherein:
said sealing means comprises;
a plurality of serrated edges extending longitudinally along said sealing edges.

14. In a camera, a removable unitary magazine as defined in claim 12, wherein:
said lining walls comprise;
at least three spaced parallel sealing gaskets extending generally transversely of each of said lining walls and being particularly adapted to be disposed in mutual cooperative interlocking engagement with one another;
one of said sealing gaskets being disposed generally medially and longitudinally of two other of said sealing gaskets to define a plurality of liquid-tight spaces confined thereby.

References Cited by the Examiner

UNITED STATES PATENTS

| | | | |
|---|---|---|---|
| 2,558,858 | 7/51 | Land | 95—13 |
| 2,661,292 | 12/53 | Land | 95—13 X |
| 2,856,829 | 10/58 | Orlando | 95—14 |

FOREIGN PATENTS 944,287  11/48  France.

NORTON ANSHER, *Primary Examiner.*

JOHN M. HORAN, *Examiner.*